United States Patent
Venkataraman et al.

(10) Patent No.: US 6,546,451 B1
(45) Date of Patent: Apr. 8, 2003

(54) METHOD AND APPARATUS FOR DECOUPLING PROCESSOR SPEED FROM MEMORY SUBSYSTEM SPEED IN A NODE CONTROLLER

(75) Inventors: Swaminathan Venkataraman, San Jose, CA (US); Selfia Halim, Los Gatos, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/409,639

(22) Filed: Sep. 30, 1999

(51) Int. Cl.<sup>7</sup> ................................................ G06F 1/00
(52) U.S. Cl. ...................................... 710/317; 710/310
(58) Field of Search ............................... 710/52, 54, 53, 710/57, 58, 60, 61, 305, 306, 310, 317, 316; 711/167, 169

(56) References Cited

U.S. PATENT DOCUMENTS

| | | | |
|---|---|---|---|
| 5,050,069 A | | 9/1991 | Hillis et al. .................. 364/200 |
| 5,138,637 A | * | 8/1992 | Fox ............................. 375/118 |
| 5,440,691 A | * | 8/1995 | Carrafiello et al. ............ 710/56 |
| 5,444,847 A | * | 8/1995 | Iitsuka ....................... 710/107 |
| 5,822,777 A | * | 10/1998 | Leshem et al. ............. 711/167 |
| 5,960,468 A | | 9/1999 | Paluch ....................... 711/219 |
| 6,161,160 A | * | 12/2000 | Niu et al. .................... 710/305 |
| 6,230,219 B1 | * | 5/2001 | Fields, Jr. et al. ............ 710/22 |
| 6,269,413 B1 | * | 7/2001 | Sherlock ...................... 710/52 |
| 6,279,077 B1 | * | 8/2001 | Nasserbakht et al. ........ 711/118 |
| 6,304,936 B1 | * | 10/2001 | Sherlock ..................... 710/305 |

FOREIGN PATENT DOCUMENTS

| EP | 0 288 636 A2 | 11/1988 | ........... G06F/15/16 |
|---|---|---|---|

OTHER PUBLICATIONS

International Search Report in International Application No. PCT/us 00/25843, dated Feb. 9, 2001, 6 pages.

* cited by examiner

*Primary Examiner*—Mark H. Rinehart
*Assistant Examiner*—Raymond N Phan
(74) *Attorney, Agent, or Firm*—Baker Botts L.L.P.

(57) ABSTRACT

A node controller (12) includes a processor interface unit (24), a crossbar unit (26), and a memory directory interface unit (22). Request and reply messages pass from the processor interface unit (24) to the crossbar unit (26) through a processor interface output queue (52). The processor interface unit (24) writes a request message into the processor interface output queue (52) using a processor interface clock to latch a write address from a write address latch (62) in a synchronizer (60). The write address is encoded by a Gray code counter (64) and latched by a first sync latch (66) and a second sync latch (18) using a core clock of the crossbar unit (30). The output of the second sync latch (68) provides one of the inputs to a read address latch (70) using the core clock of the crossbar unit (30). The read address is provided to the processor interface output queue (52) so that the request message is presented to the crossbar unit (30) in its clock domain regardless of the clock frequency of the processor interface unit (24).

19 Claims, 3 Drawing Sheets

METHOD AND APPARATUS FOR DECOUPLING PROCESSOR SPEED FROM MEMORY SUBSYSTEM SPEED IN A NODE CONTROLLER

TECHNICAL FIELD OF THE INVENTION

The present invention relates in general to computer system architectures and more particularly to a method and apparatus for decoupling processor speed from memory subsystem speed in a node controller.

BACKGROUND OF THE INVENTION

Existing computer systems typically operate at processor speed that is a multiple of the processor system bus. The processor system bus is the communication link between the processor and a node controller in the computer system. The node controller interfaces the processor with a memory that operates at its own speed, typically at a different speed than the processor. The node controller typically has the same operating speed as the memory. Generally, the processor system bus clock is derived from the operating clock of the node controller, either the same as or a divided down version of the node controller's clock. Because the clock of the node controller has some ratio relationship to a speed of the processor, independent scaling of the processor and the node controller of memory cannot be accomplished. As processor roadmaps extend for many generations scaling up in frequencies, conventional computer system designs do not have the capability to adjust for changes in frequencies of processors with respect to their memories and node controllers. Therefore, it is desirable to provide a computer system where the speed of a processor is not derived or dependent of a speed of its node controller or memory.

SUMMARY OF THE INVENTION

From the foregoing, it may be appreciated that a need has arisen for a technique to decouple the processor's frequency from a core frequency of its memory and associated node controller. In accordance with the present invention, an apparatus and method of decoupling processor speed from memory subsystem speed in a node controller are provided which substantially eliminate or reduce disadvantages and problems associated with conventional computer system designs.

According to an embodiment of the present invention, there is provided a method of decoupling processor speed from memory subsystem speed of a node controller that includes receiving data from a processor and writing the data into a buffer of a crossbar unit in the node controller in response to a clock rate of the processor system bus. The data is read from the buffer in response to a clock rate of the crossbar unit. Data is written into the buffer by latching a write address of a buffer location with the clock rate of the processor. The write address is then passed to crossbar unit of the node controller by successive latching of the write address according to a clock rate of the node controller. A read address is generated according to the clock rate of the node controller in response to the write address. The data is read out of the buffer, which was written into the buffer at the speed of the processor system bus, at the speed of the crossbar unit.

The present invention provides various technical advantages over conventional computer system designs. For example, one technical advantage is to decouple the speed of the processor from the speed of its associated memory and node controller. Another technical advantage is the ability to have the processor clock domain be slower than, equal to, or faster than the core clock domain of the node controller. Yet another technical advantage is to synchronize the transfer of data using two different clock speeds. Still another technical advantage is to synchronize write addresses used to write data into a buffer at a first clock speed to form a read address to read data from the buffer at a second clock speed. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
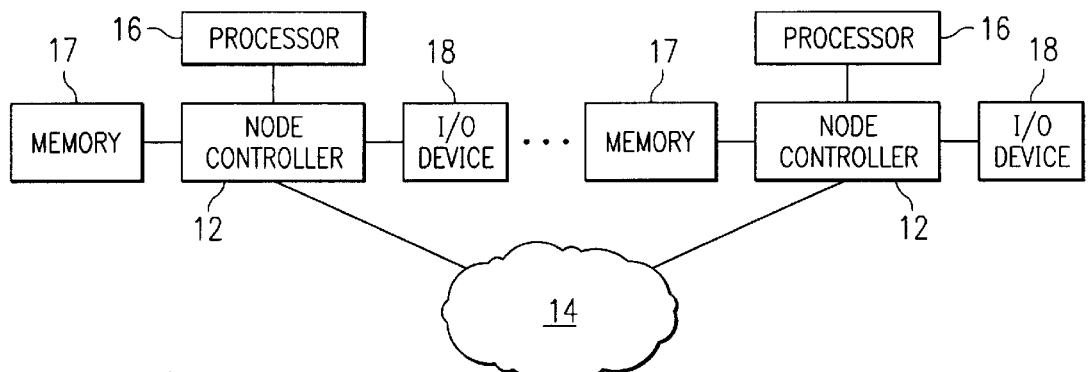
FIG. 1 illustrates a block diagram of a computer system.

FIG. 1 is a block diagram of a computer system 10. Computer system 10 includes a plurality of node controllers 12 interconnected by a network 14. Each node controller 12 processes data and traffic both internally and with other node controllers 12 within computer system 10 over network 14. Each node controller may communicate with a local processor 16, a local memory device 17, and a local input/output device 18.

Figure 2:
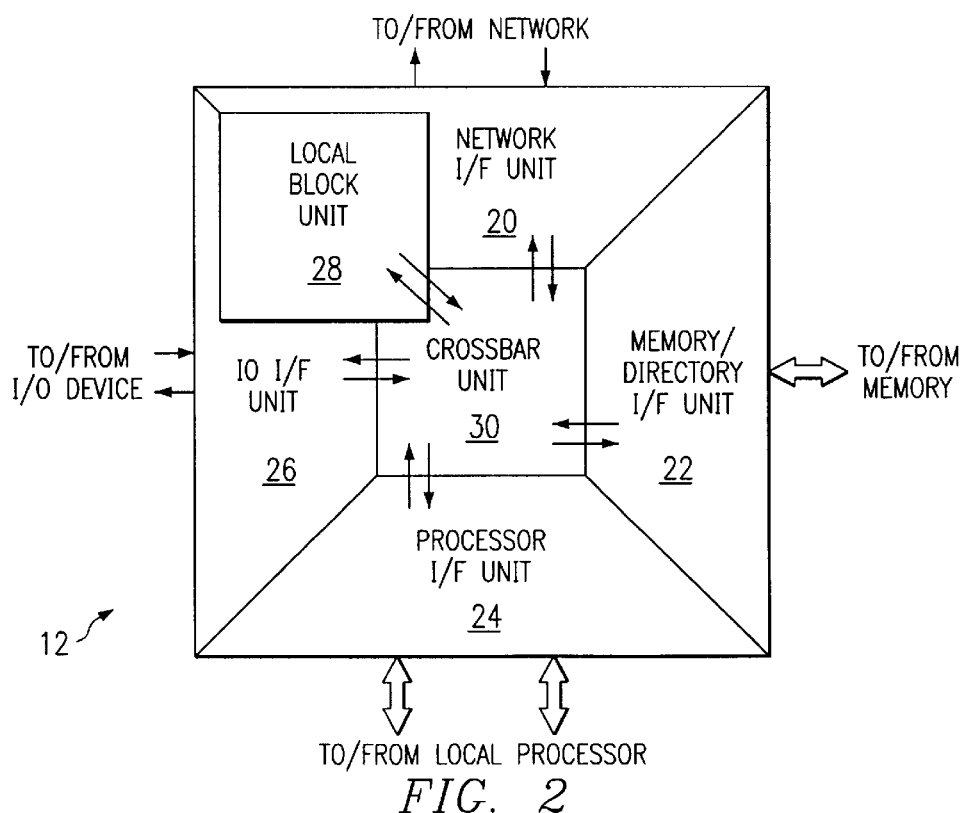
FIG. 2 illustrates a simplified block diagram of a node controller in the computer system.

FIG. 2 is a block diagram of node controller 12. Node controller 12 includes a network interface unit 20, a memory directory interface unit 22, a processor interface unit 24, an input/output interface unit 26, a local block unit 28, and a crossbar unit 30. Network interface unit 20 may provide a communication link to network 14 in order to transfer data, messages, and other traffic to other node controllers 12 in computer system 10. Processor interface unit 22 may provide a communication link with one or more local processors 16. Memory directory interface unit 22 may provide a communication link with one or more local memory devices 17. Input/output interface unit 26 may provide a communication link with one or more local input/output devices 18. Local block unit 28 is dedicated to processing invalidation requests from memory directory interface unit 22 or from a remote memory directory interface unit 22 associated with a remote node controller 12. Crossbar unit 30 arbitrates the transfer of data, messages, and other traffic for node controller 12.

Figure 3:
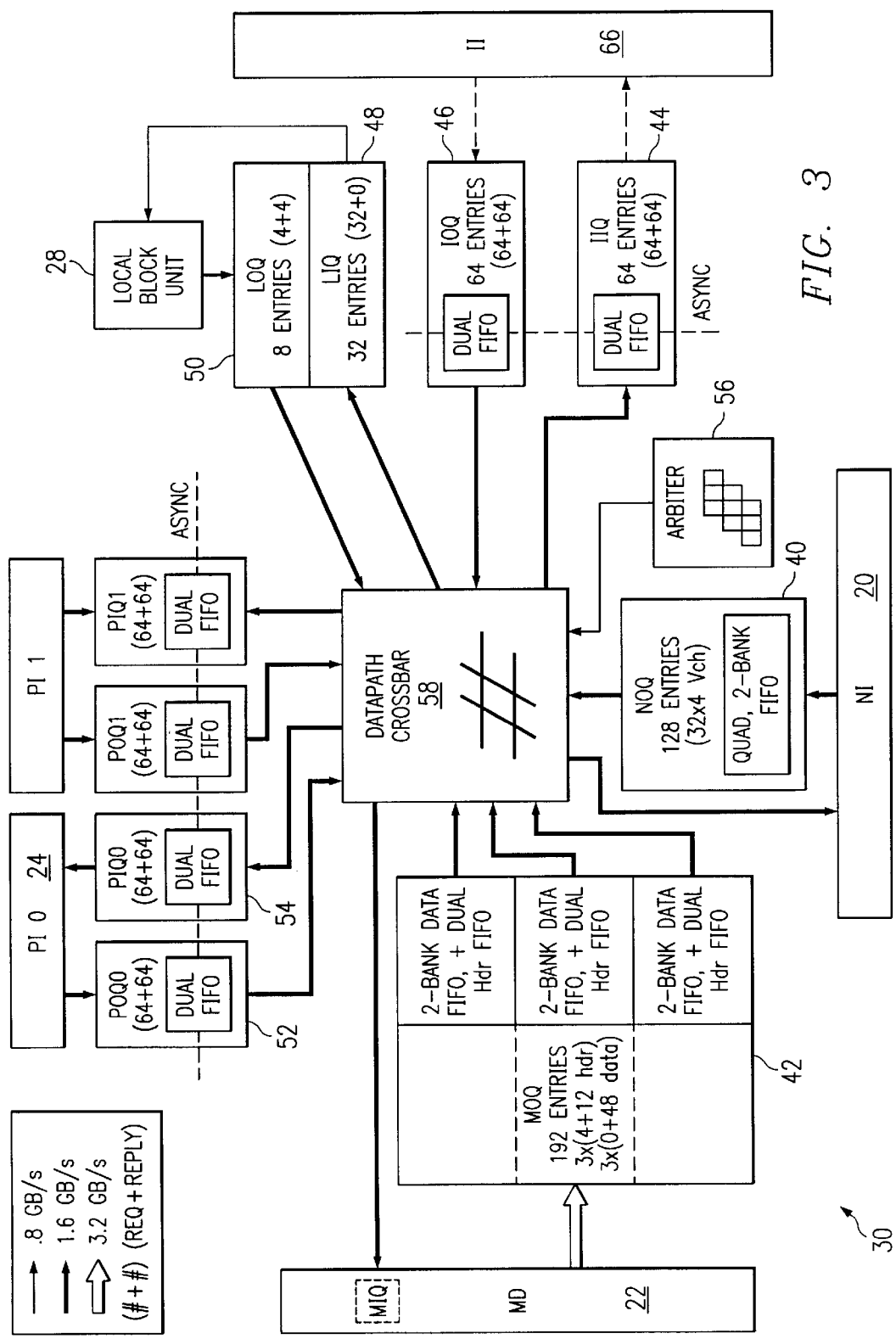
FIG. 3 illustrates a simplified block diagram of a crossbar unit in the node controller.

FIG. 3 is a block diagram of crossbar unit 30. Crossbar unit 30 includes a network interface output queue 40, a memory output queue 42, an Input/Output input queue 44, an Input/Output output queue 46, a local block input queue 48, a local block output queue 50, a processor interface output queue 52, a processor interface input queue 54, an arbiter 56, and a datapath crossbar 58. Datapath crossbar 58 provides data, messages, and other traffic to memory director interface unit 22 and network interface unit 20. Datapath crossbar 58 provides data, messages, and other traffic to processor interface input queue 54 and Input/Output input queue 44. Datapath crossbar 58 provides invalidation requests to local block input queue 48 for processing by local block unit 28. Datapath crossbar 58 receives invalidation messages from local block output queue 50 as generated by local block unit 28. Datapath crossbar 58 also receives data from memory output queue 42 and data, messages, and other traffic from Input/Output output queue 46. Datapath crossbar 58 also receives data, control messages, other traffic, and invalidation requests from processor interface output queue 52 and network interface output queue 40. Arbiter 56 determines the configuration of datapath crossbar 58 in transferring data, control messages, other traffic, and invalidation requests among all queues within crossbar unit 30 and units of node controller 12.

There may be asynchronous boundaries between processor interface unit 24 and crossbar unit 30 and between input/output interface unit 26 and crossbar unit 30. This asynchronous boundary occurs as a result of a core clock driving crossbar unit 30 being at a different non-integer ratio clock speed than the clock speed of processor interface unit 24 and its associated processor 16 or input/output interface unit 26 and its associated input/output device 18. Thus, data entering crossbar unit 30 from either processor interface unit 24 or input/output interface unit 26 needs to be synchronized to the core clock speed of crossbar unit 30. Preferably, the operating speed of crossbar unit 30 is the same as memory directory interface unit 22 and its associated memory 17.

Preferably, the processor core runs faster as a multiple of its system interface bus. The operating speed of processor interface unit 24 is the same as or a ratio of the operating speed of its associated processor 16. Node controller 12 interfaces to the processor system bus. Thus, processor requests are captured and written to the queues at the processor system bus frequency and not processor frequency. Preferably, the operating speed of crossbar unit 30 is the same as the operating speed of node controller 12 and the operating speed of memory 17.

Figure 4:
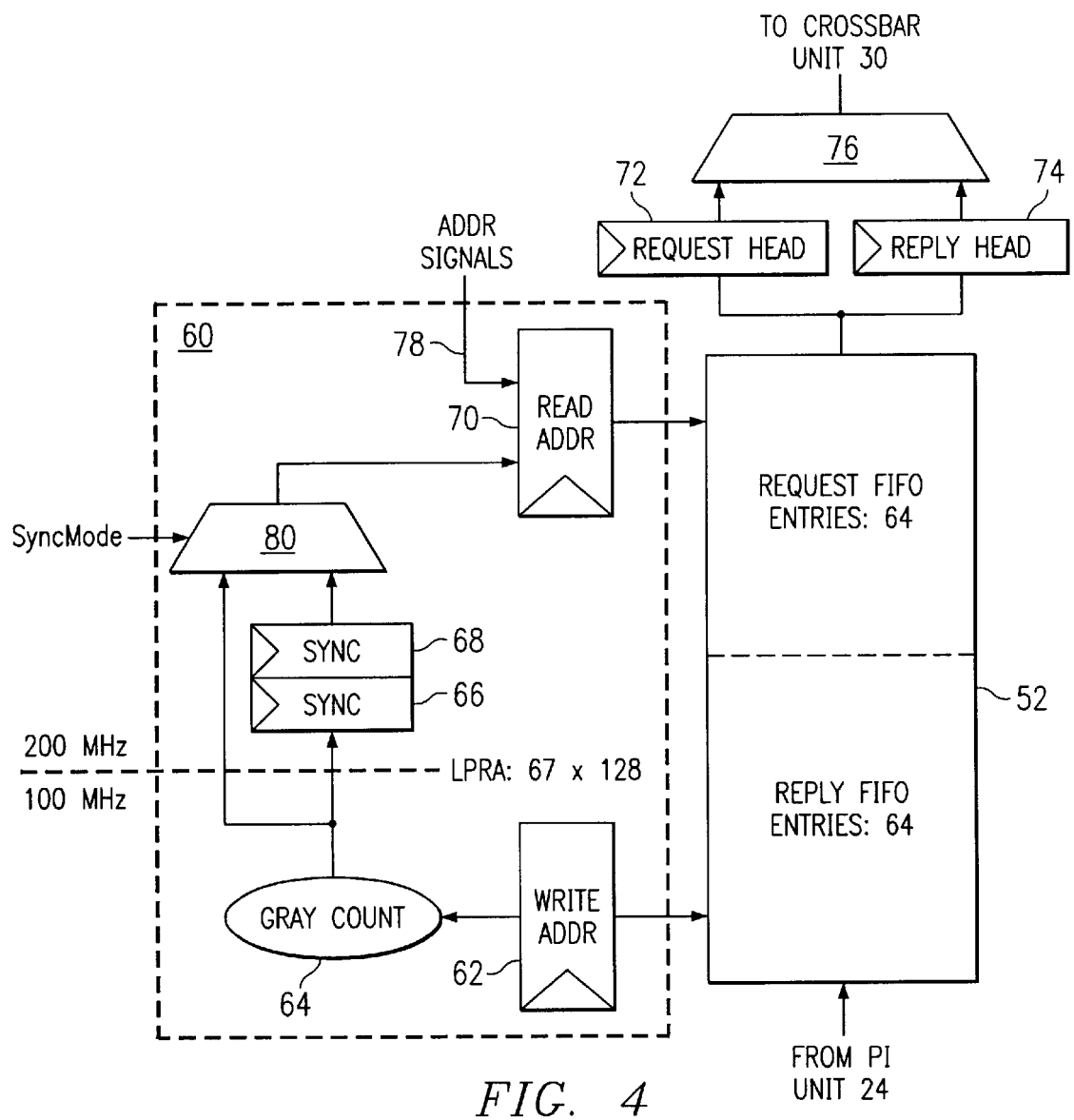
FIG. 4 illustrates a block diagram of a synchronizer in the crossbar unit.

FIG. 4 is a block diagram of a synchronizer 60 that allows for decoupling of processor speed from node controller speed. Synchronizer 60 may be used at the asynchronous boundary of crossbar unit 30 and any of Input/Output input queue 44, an Input/Output output queue 46, processor interface output queue 52, and processor interface input queue 54. For purposes of discussion, synchronizer 60 is described with reference to processor interface output queue 52 but may be similarly designed with respect to the other queues as well.

Processor interface output queue 52 accepts request and reply messages from processor interface unit 24, as generated by a processor 16, at a clock frequency of processor interface unit 24 and processor 16. Processor interface output queue 52 presents request and reply messages to crossbar unit 30 at a clock frequency of crossbar unit 30.

Synchronizer 60 includes a write address latch 62, a Gray code counter 64, a first sync latch 66, a second sync latch 68, and a read address latch 70. Processor interface output queue 52 is virtually divided into separate request and reply message buffers, though the request and reply message buffers preferably share the same buffer memory. Information from processor interface output queue 52 is provided to a request header latch 72 and a reply header latch 74. The appropriate message with its associated header information is provided from either request header latch 72 or reply header latch 74 to crossbar unit 30 as determined by a selector 76.

In operation, a request message is provided from processor interface unit 24 to processor interface output queue 52. The write address for storing the request message in processor interface output queue 52 is provided by write address latch 62 according to a PI CLK in the processor's clock domain having a clock frequency of processor interface unit 24. Write addresses may be provided to write address latch 62 through any of various conventional ways such as through an incremental counter.

The write address for the request message is passed from processor interface unit 24 to crossbar unit 30. The write address is then used as an input along with other address signals 78 to form a read address for providing the request message to crossbar unit 30 at its core clock frequency in the memory and node controller's clock domain. The write address thus becomes one of the factors used to determine the read address.

In order to pass the write address from processor interface unit 24 to crossbar unit 30, synchronization of the write address from the processor clock domain to the memory and node controller clock domain is performed. To accomplish this synchronization, a particular write address used to enter the request message into processor interface 24 is provided by write address latch 62 to Gray code counter 64. When bits are transferred across the clock domain boundary, the bits may not arrive on the other side of the boundary at the same time due to logic and wire delays. If the bits are only binary encoded, incorrect information may be transferred at the receiving clock edge. Gray code counter 64 encodes the write address with Gray encoding. Gray code has the property that only one bit changes in going from one state to the next. If the one bit that is changing does not arrive in time with respect to the receiving clock edge, the resulting transferred information is just the same as the current state instead of the next state. This prevents errors as there is no way of guaranteeing that all bits will change simultaneously across the clock domain boundary.

In addition, with the use of two different clocks, there is no capability to determine how the edges of the two clocks will line up. Bits in the middle transition, from high to low or low to high, may be latched by the receiving clock and thus cause metastability. First sync latch 66 and second sync latch 68 are used to avoid metastability and provide proper synchronization from PI CLK to CORE CLK. Preferably, first sync latch 66 and second sync latch 68 are metastable hardy flip-flops. First sync latch 66 and second sync latch 68 provide successive latching of the encoded write address in response to CORE CLK operating at a speed of the memory and node controller domain. The use of two synchronization latches insures that processor interface output queue (52) is not written into and read from during the same clock cycle. The minimum synchronization time is an additional one receiving clock cycle with the maximum synchronization time being two receiving clock cycles. After such synchronization, the write address is provided as one of the inputs to read address latch 70 that generates a read address in response to CORE CLK. The read address is used to provide the request message to crossbar unit 30 for appropriate transfer.

Synchronizer 60 may also include an optional capability to have node controller 12 run in a synchronous or asynchronous mode. In asynchronous mode, a selector 80, selects the output of second sync latch 68 as one of the inputs to read address latch 70 in response to a SYNCMODE signal. In asynchronous mode, PI CLK is derived from an external oscillator associated with its corresponding processor 16 to provide the flexibility for processor interface unit 24 to operate faster or slower than CORE CLK of crossbar unit 30. For synchronous mode operation, selector 80 selects the output of Gray code counter 64 as one of the inputs to read address latch 70, bypassing the first sync latch 66 and second sync latch 68. In synchronous mode, PI CLK is derived as a divide down version of an internal oscillator that also sources CORE CLK. Lower latency is achieved in synchronous mode through the bypassing of the synchronization latches.

Thus, it is apparent that there has been provided, in accordance with the present invention, a method and apparatus for decoupling processor speed from memory subsystem speed in a node controller that satisfies the advantages set forth above. Although the present invention has been described in detail, it should be understood that various changes, substitutions, and alterations may be made herein. For example, a specific synchronization technique other than the disclosed Gray coding may be implemented with similar results. Other examples may be readily ascertainable by those skilled in the art and may be made herein without departing from the spirit and scope of the present invention as defined by the following claims.

What is claimed is:

1. A method of decoupling processor speed from memory subsystem speed of a node controller, comprising:
   receiving data from a processor;
   writing the data into a buffer of a crossbar unit of the node controller in response to a clock rate of the processor independent of a clock rate of the crossbar unit;
   reading the data from the buffer in response to a clock rate of the crossbar unit independent of the clock rate of the processor.

2. The method of claim 1, wherein writing the data includes latching a write address in response to the clock rate of the processor independent of the clock rate of the crossbar unit.

3. The method of claim 2, wherein reading the data includes encoding the write address using a Gray code.

4. The method of claim 3, wherein reading the data includes latching the encoded write address in response to the clock rate of the crossbar unit.

5. A method of decoupling processor speed from memory subsystem speed of a node controller, comprising:
   receiving data from a processor;
   writing the data into a buffer of a crossbar unit of the node controller in response to a clock rate of the processor, wherein writing the data includes latching a write address in response to the clock rate of the processor;
   reading the data from the buffer in response to a clock rate of the crossbar unit, wherein reading the data includes encoding the write address using a Gray code, wherein reading the data includes latching the encoded write address in response to the clock rate of the crossbar unit;
   bypassing the latching of the encoded write address in response to the node controller operating in a synchronous mode.

6. The method of claim 4, wherein reading the data includes generating a read address from the encoded write address in response to the clock rate of the crossbar unit.

7. An apparatus for decoupling processor speed from memory subsystem speed of a node controller, comprising:
   a buffer in a crossbar unit of the node controller operable to receive data from a processor;
   a write address latch operable to generate a write address in response to a clock rate of the processor independent of a core clock rate of the crossbar unit, the write address operable to store the data in the buffer;
   a read address latch operable to generate a read address at the core clock rate of the crossbar unit independent of the clock rate of the processor in response to the write address, the read address operable to retrieve the data from the buffer.

8. The apparatus of claim 7, further comprising:
   a Gray code counter operable to encode the write address.

9. The apparatus of claim 7, further comprising:
   first and second synchronization latches operable to latch the write address according to the core clock rate of the crossbar unit.

10. An apparatus for decoupling processor speed from memory subsystem speed of a node controller, comprising:
    a buffer in a crossbar unit of the node controller operable to receive data from a processor;
    a write address latch operable to generate a write address in response to a clock rate of the processor, the write address operable to store the data in the buffer;
    a read address latch operable to generate a read address at a core clock rate of the crossbar unit in response to the write address, the read address operable to retrieve the data from the buffer
    first and second synchronization latches operable to latch the write address according to the core clock rate of the crossbar unit, wherein the first and second synchronization latches are bypassed in response to the node controller operating in a synchronous mode.

11. The apparatus of claim 7, wherein the data is written into the buffer in the clock domain of the processor.

12. The apparatus of claim 11, wherein the data is read from the buffer in the clock domain of the node controller.

13. A method of decoupling processor speed from memory subsystem speed of a node controller, comprising:
    generating a write address according to a clock rate associated with a processor;
    receiving data from the processor;
    writing the data in a buffer of a crossbar unit of the node controller according to the write address and the clock rate associated with the processor independent of a memory system speed of the crossbar unit;
    synchronizing the write address to the memory subsystem speed of the crossbar unit independent of the clock rate associated with the processor;
    generating a read address from the synchronized write address according to the memory subsystem speed of the crossbar unit independent of the clock rate associated with the processor;
    reading the data from the buffer according to the read address and the memory subsystem speed of the crossbar unit independent of the clock rate associated with the processor.

14. The method of claim 13, wherein synchronizing the write address includes encoding the write address according to a Gray code scheme.

15. The method of claim 13, wherein synchronizing the write address includes latching the write address according to the memory subsystem speed of the crossbar unit.

16. A method of decoupling processor speed from memory subsystem speed of a node controller, comprising:
    generating a write address according to a clock rate associated with a processor;
    receiving data from the processor;

writing the data in a buffer of a crossbar unit of the node controller according to the write address and the clock rate associated with the processor;

synchronizing the write address to the memory subsystem speed of the crossbar unit;

generating a read address from the synchronized write address according to the memory subsystem speed of the crossbar unit;

reading the data from the buffer according to the read address and the memory subsystem speed of the crossbar unit;

wherein synchronizing the write address includes latching the write address according to the memory subsystem speed of the crossbar unit, wherein latching the write address includes performing two successive latchings of the write address both at the memory subsystem speed of the crossbar unit.

17. The method of claim 16, further comprising:

bypassing the two successive latchings of the write address in response to the node controller operating in a synchronous mode.

18. The method of claim 17, wherein the clock rate associated with the processor and the memory subsystem speed of the crossbar unit are derived from a same clock in the synchronous mode.

19. The method of claim 13, wherein writing the data in the buffer and reading the data from the buffer occur in different cycles of the clock rate associated with the processor and the memory subsystem speed of the crossbar unit.

* * * * *